Aug. 11, 1931.   J. O. HUXFORD   1,818,399
PULLER
Filed May 20, 1929

INVENTOR.
J. O. Huxford
BY
ATTORNEY.

Patented Aug. 11, 1931

1,818,399

UNITED STATES PATENT OFFICE

JERE O. HUXFORD, OF PERRY, FLORIDA

PULLER

Application filed May 20, 1929. Serial No. 364,630.

The invention relates to pullers of the type used for forming shade streaks in pine trees and in the turpentine industry, and has for its object to provide a device of this character comprising a handle member having a right angularly disposed arm terminating in diverging arms, which diverging arms have formed integral therewith elongated cutting members arcuately shaped in vertical transverse cross section, and constructed in a manner whereby upon the cutting members entering the tree an excessive distance, said arms will limit the further embedding of the cutters in the tree.

A further object is to form the handle member, diverging arms and cutters from a single piece of material, thereby reducing the cost of manufacture to a minimum.

A further object is to provide a puller which may be used on a tree for extending the streak upwardly when the streak is too high for chipping with a hack. Also to construct the puller that the same may be used as a hack as well as a puller, thereby combining two implements in a single device.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
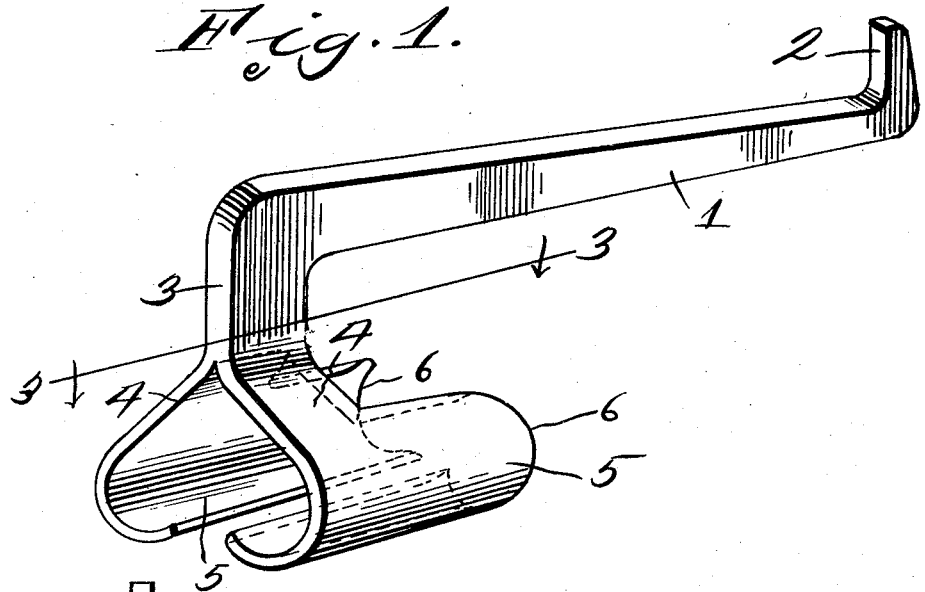
Figure 1 is a perspective view of the puller.
Figure 3:
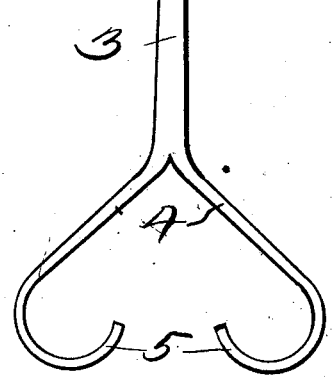
Figure 3 is a horizontal sectional view through the puller taken on line 3—3 of Figure 1.
Figure 2:
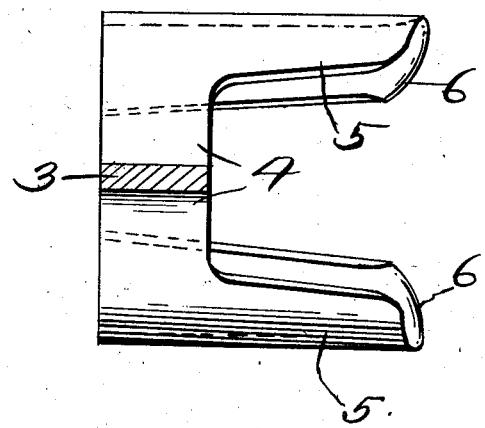
Figure 2 is a front elevation of the puller.

Referring to the drawings, the numeral 1 designates an elongated handle member having a right angle lug 2 so that a conventional form of puller handle may be attached to the device. One end of the handle member 1 terminates in a right angularly disposed arm 3, the lower end of which terminates in diverging arms 4, which may be formed by splitting the arm 3. The lower ends of the diverging arms 4 terminate in elongated cutter members 5 which are segmentally shaped in vertical transverse cross section and have their rear ends 6 sharpened, whereby when the cutter members are pulled, they will embed in the surface of the trees for forming the streak, and it will be noted that as the members 5 are spaced a relatively wide streak will be formed, and the streak is formed without a hacking operation.

By providing the diverging arms 4, it is obvious that when the cutter members 5 enter the surface of the tree, a depth greater than their width, said arms 4 will prevent the cutting of the streak at an excessive depth, therefore it will be seen that the cutting of streaks to a limited depth only is insured, consequently damage to the tree is obviated. When desired either of the cutter members 5 may be used as hacks or both at the same time, and at which time the device is used with a hacking operation as distinguished from a pulling operation. During a hacking or pulling operation where only one of the cutters is used, it is obvious that by simply turning the tool the streak may be cut circumferentially to the right or left by the operator, thereby allowing him to hold the tool in a natural and normal position, and in a position where the cutter, irrespective of which direction the streak is being hacked or made will be in full view of the operator.

From the above it will be seen that a double streak puller is provided which is formed from a single piece of metal which may be originally stamped in substantial angular form and then the arm 3 split as well as the portion forming the cutters 5, and after which the arm and portion may be split and bent to the form shown in Figure 1, thereby allowing the device to be cheaply manufactured and sold.

The invention having been set forth what is claimed as new and useful is:

1. A streak puller comprising an elongated handle member, a right angularly disposed arm at one end of the handle member, said arm terminating in diverging arms extending outwardly from opposite sides thereof, said diverging arms terminating in longitudinally disposed cutter members segmentally shaped in vertical transverse cross section, said arms and cutter members being in spaced relation.

2. A streak puller comprising an elongated handle member, an angularly disposed arm carried by one end of the handle member, said angularly disposed arm terminating in diverging arms of substantially one half the thickness as the right angularly disposed arm and formed therefrom, said diverging arms terminating in cutter members longitudinally disposed and extending towards the other end of the handle member, said cutter members being spaced apart, whereby the portion of the tree between the cutter members may be observed during the cutting operation as well as the cutting operation of each cutter, said cutter members having their ends sharpened.

In testimony whereof I hereunto affix my signature.

JERE O. HUXFORD.